(12) United States Patent
Kwon

(10) Patent No.: US 11,385,684 B2
(45) Date of Patent: Jul. 12, 2022

(54) METHOD FOR CONTROLLING WINDOW AND ELECTRONIC DEVICE THEREFOR

(71) Applicant: Samsung Electronics Co., Ltd., Suwon-si (KR)

(72) Inventor: Yongjin Kwon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/326,143

(22) Filed: May 20, 2021

(65) Prior Publication Data

US 2022/0121244 A1 Apr. 21, 2022

(30) Foreign Application Priority Data

Oct. 19, 2020 (KR) .................. 10-2020-0135449

(51) Int. Cl.
*G09G 5/02* (2006.01)
*G06F 1/16* (2006.01)
*G09G 5/00* (2006.01)

(52) U.S. Cl.
CPC ........... *G06F 1/1652* (2013.01); *G09G 5/005* (2013.01); *G06F 2203/04102* (2013.01); *G09G 2340/0421* (2013.01)

(58) Field of Classification Search
CPC ........ G06F 1/1652; G06F 2203/04102; G09G 3/3266; G09G 3/3275; G09G 5/005; G09G 2340/0421; G09F 9/30; G09F 9/301; G02F 1/13452; H01L 27/124; H01L 27/3276; H05K 2201/10128
See application file for complete search history.

(56) References Cited

U.S. PATENT DOCUMENTS 10,936,017 B1 * 3/2021 Choi ...................... G06F 1/1656
11,003,207 B2 * 5/2021 Kim ...................... H04N 5/2257
(Continued)

FOREIGN PATENT DOCUMENTS

KR  10-2011-0073475 A  6/2011
KR  10-2015-0081628 A  7/2015
(Continued)

OTHER PUBLICATIONS

Notice of Patent Grant dated Apr. 2, 2021 in connection with Korean Patent Application No. 10-2020-0135449, 9 pages.
(Continued)

*Primary Examiner* — Joe H Cheng

(57) ABSTRACT

An electronic device includes a first housing and a second housing that overlaps the first housing. The electronic device includes a display with a first region and a second region. The electronic device includes a processor configured to control the display to display at least one content. The processor is configured to determine a first content and a second content. The processor is configured to identify that a region of the display is extended. In response to identifying that the region of the display is extended, the processor is configured to change a resolution of the first content to correspond to a size of the extended region of the display while the display is being extended. The processor is configured to change a resolution of the second content to correspond to the size of the extended region of the display after the extension of the display is completed.

20 Claims, 14 Drawing Sheets

(56) References Cited

U.S. PATENT DOCUMENTS

| | | | |
|---|---|---|---|
| 2008/0074444 A1* | 3/2008 | Morikawa | G09G 5/005 345/660 |
| 2009/0003795 A1* | 1/2009 | Yashima | H04N 21/4312 386/230 |
| 2010/0060547 A1 | 3/2010 | Bloebaum et al. | |
| 2011/0176260 A1* | 7/2011 | Walters | G06F 1/1641 361/679.01 |
| 2012/0314400 A1* | 12/2012 | Bohn | G06F 1/1652 362/97.1 |
| 2013/0058063 A1* | 3/2013 | O'Brien | G06F 1/1652 361/807 |
| 2013/0201208 A1* | 8/2013 | Cho | G06F 3/0488 345/619 |
| 2014/0118317 A1 | 5/2014 | Song et al. | |
| 2015/0192986 A1 | 7/2015 | Yang | |
| 2016/0349971 A1* | 12/2016 | Chi | G06F 3/04845 |
| 2017/0011714 A1* | 1/2017 | Eim | G06F 1/1677 |
| 2017/0154609 A1* | 6/2017 | Yoon | G09G 5/38 |
| 2017/0286042 A1* | 10/2017 | Lee | G06F 3/0482 |
| 2018/0284964 A1* | 10/2018 | Kang | G09F 9/301 |
| 2018/0374452 A1* | 12/2018 | Choi | G06F 3/04886 |
| 2019/0146558 A1* | 5/2019 | Ohata | H04M 1/02 361/679.21 |
| 2019/0261519 A1 | 8/2019 | Park et al. | |
| 2019/0346954 A1* | 11/2019 | Jung | G06F 1/3209 |
| 2019/0384438 A1* | 12/2019 | Park | G06F 3/0412 |
| 2020/0050285 A1 | 2/2020 | Kwon et al. | |
| 2020/0363841 A1 | 11/2020 | Kim et al. | |
| 2021/0012751 A1 | 1/2021 | An et al. | |

FOREIGN PATENT DOCUMENTS

| | | |
|---|---|---|
| KR | 10-2016-0150533 A | 12/2016 |
| KR | 10-2019-0062855 A | 6/2019 |
| KR | 10-2019-0101184 A | 8/2019 |
| KR | 10-2019-0110318 A | 9/2019 |
| KR | 10-2086715 B1 | 3/2020 |

OTHER PUBLICATIONS

Notice of Preliminary Rejection dated Mar. 19, 2021 in connection with Korean Patent Application No. 10-2020-0135449, 18 pages.
International Search Report of the International Searching Authority in connection with International Application No. PCT/KR2021/005861 dated Aug. 25, 2021, 3 pages.

* cited by examiner

METHOD FOR CONTROLLING WINDOW AND ELECTRONIC DEVICE THEREFOR

CROSS-REFERENCE TO RELATED APPLICATION

This application is based on and claims priority under 35 U.S.C. § 119 to Korean Patent Application No. 10-2020-0135449 filed on Oct. 19, 2020 in the Korean Intellectual Property Office, the disclosure of which is herein incorporated by reference in its entirety.

BACKGROUND

1. Field

Various embodiments of the disclosure relate to a technique of controlling a screen of an electronic device provided with a flexible display.

2. Description of Related Art

Electronic devices are provided with complex functions such as making a photo or a video, playing a music file or a video file, playing a game, receiving a broadcast, supporting wireless Internet, etc., and are implemented in the form of integrated multimedia players. Accordingly, electronic devices are developing into new forms in terms of hardware or software in order to enhance portability and convenience while satisfying user's desire. As one example of such development, an electronic device may be implemented in a rollable type including a flexible display.

The above information is presented as background information only to assist with an understanding of the disclosure. No determination has been made, and no assertion is made, as to whether any of the above might be applicable as prior art with regard to the disclosure.

SUMMARY

An electronic device of a rollable type including a flexible display may have its mechanical state changed by a user gesture. In addition, the electronic device of the rollable type may control operations of the electronic device, based on a change in the state. For example, the electronic device of the rollable type may change from a state in which a portion of the flexible display is rolled in the electronic device to a state in which the portion is rolled out. When the electronic device of the rollable type changes a resolution of the display in the middle of changing its state, the electronic device may refine at least one window displayed on the display simultaneously. In this case, much time may be required to refine the window or the window may be refined unnaturally (for example, may be refined at long intervals), and thus user experience may be degraded.

Various embodiments of the disclosure may provide stably displaying a window for a user in an electronic device including a flexible display when a state of the electronic device is changed.

In an embodiment, an electronic device includes: a first housing; a second housing which overlaps the first housing at least in part and is movable; a display having at least a first region exposed to an outside of the electronic device through a front surface of the electronic device, a second region extended from the first region of the display being drawn out from an inside of the first housing and being exposed to the outside of the electronic device along with the first region when the electronic device switches from a first state to a second state, the second region being drawn into the first housing when the electronic device switches from the second state to the first state; and at least one processor operatively connected with the display, wherein the at least one processor is configured to: control the display to display a plurality of contents on the display; determine a first content from among the plurality of contents, and a second content which is distinct from the first content, according to attribute information of each of the plurality of contents; identify that a region of the display is extended while the plurality of contents are displayed on the display; in response to it being identified that the region of the display is extended, change a resolution of the first content to correspond to a size of the extended region of the display while the display is being extended; and change a resolution of the second content to correspond to the size of the extended region of the display after the extension of the display is completed.

According to an embodiment, an operating method of an electronic device, the method includes: controlling a display to display a plurality of contents on the display; determining a first content from among the plurality of contents, and a second content which is distinct from the first content, according to attribute information of each of the plurality of contents; identifying that a region of the display is extended while the plurality of contents are displayed on the display; in response to it being identified that the region of the display is extended, changing a resolution of the first content to correspond to a size of the extended region of the display while the display is being extended; and changing a resolution of the second content to correspond to the size of the extended region of the display after the extension of the display is completed.

According to an embodiment, an electronic device includes: a first housing; a second housing which overlaps the first housing at least in part and is movable; a display having at least a first region exposed to an outside of the electronic device through a front surface of the electronic device, a second region extended from the first region of the display being drawn out from an inside of the first housing and being exposed to the outside of the electronic device along with the first region when the electronic device switches from a first state to a second state, the second region being drawn into the first housing when the electronic device switches from the second state to the first state; and at least one processor operatively connected with the display, wherein the at least one processor is configured to: control the display to display a plurality of contents on the display; determine a first content from among the plurality of contents, and a second content which is distinct from the first content, according to attribute information of each of the plurality of contents; identify that a region of the display is contracted while the plurality of contents are displayed on the display; in response to it being identified that the region of the display is contracted, change a resolution of the first content to correspond to a size of the contracted region of the display while the display is being contracted; and change a resolution of the second content to correspond to the size of the contracted region of the display from a time when a length in a contraction direction of the display exposed to the outside is shorter than a length in the contraction direction of a window in which the second content is displayed.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Regarding descriptions of the drawings, the same or similar reference numerals may be used for the same or similar components.

DETAILED DESCRIPTION

FIGS. 1A through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1A:
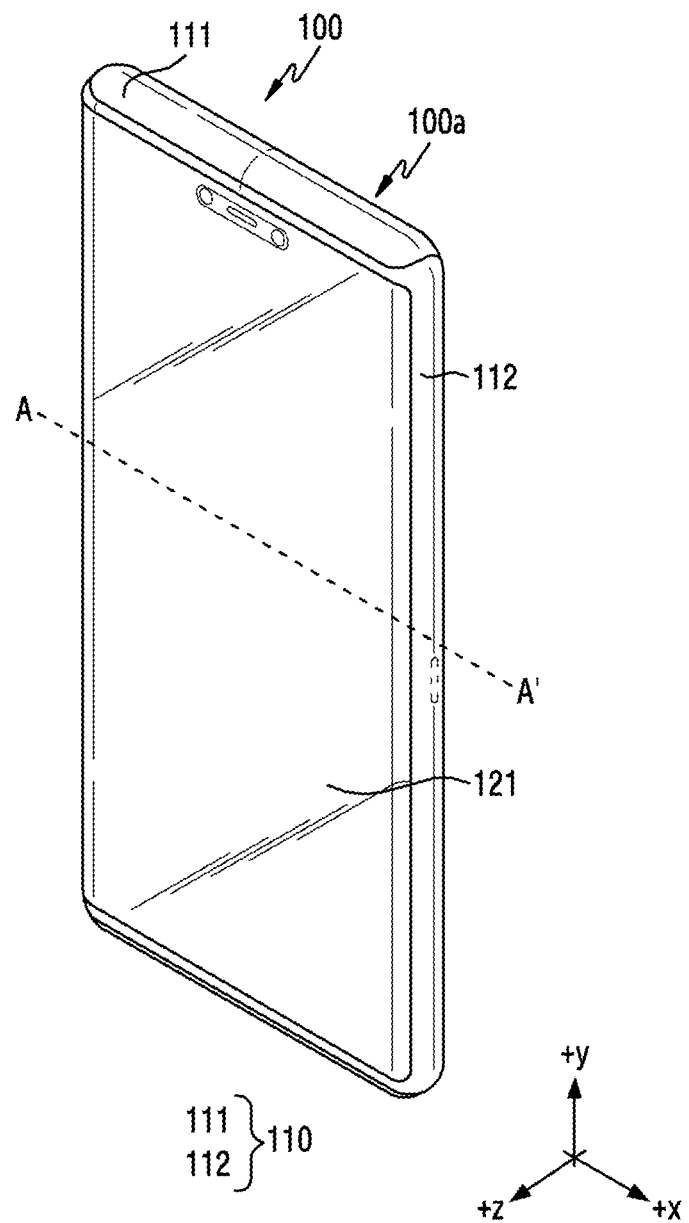
FIG. 1A illustrates a front perspective view of a first state (for example, a retracted state) of an electronic device according to an embodiment.
Figure 1B:
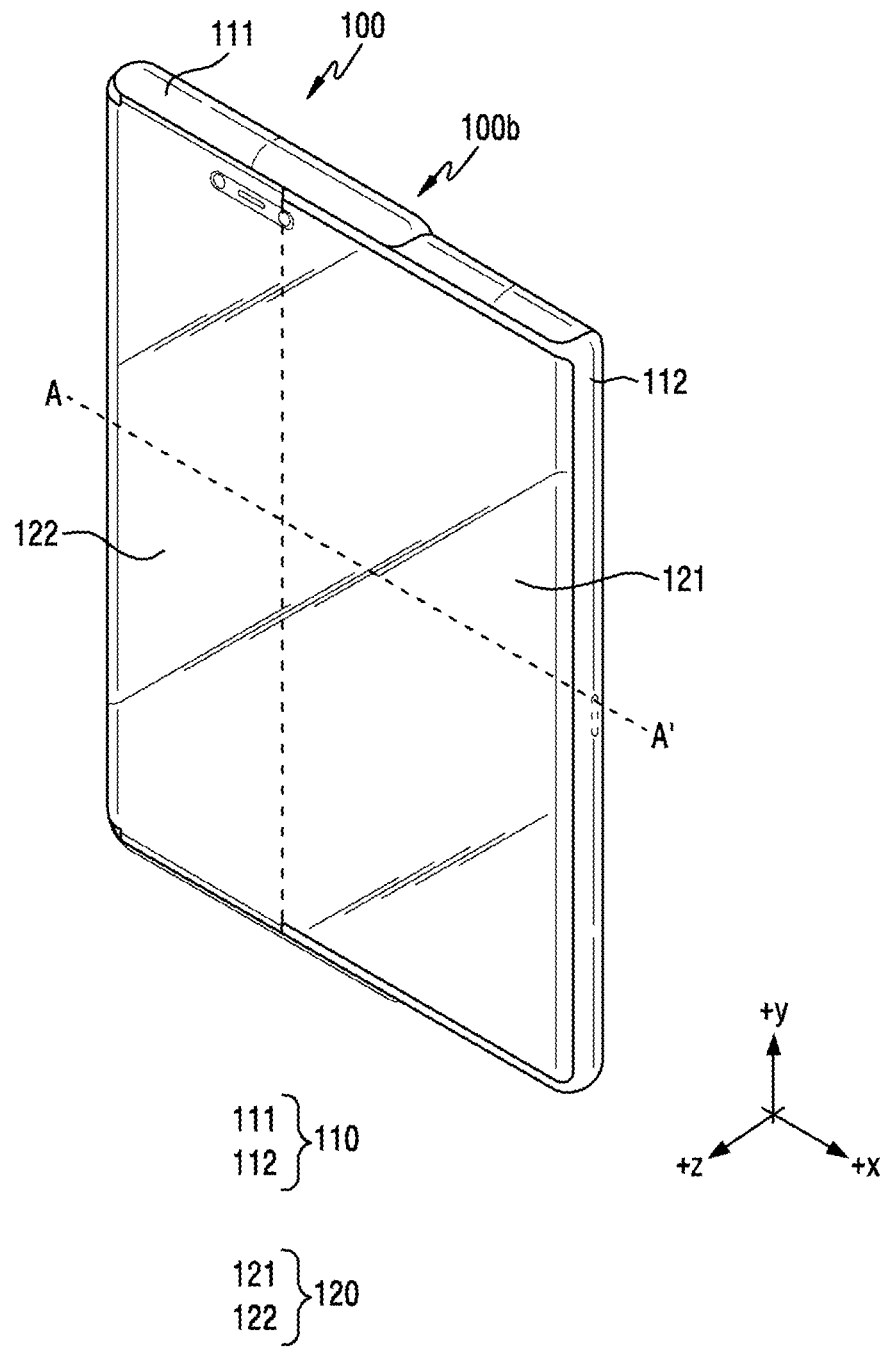
FIG. 1B illustrates a front perspective view of a second state (for example, an extended state) of the electronic device according to an embodiment.

FIG. 1A illustrates a front perspective view of a first state (for example, a retracted state) of an electronic device 100 according to an embodiment. FIG. 1B illustrates a front perspective view of a second state (for example, an extended state) of the electronic device 100 according to an embodiment.

According to various embodiments disclosed in the disclosure, a surface that faces in substantially the same direction as a direction in which at least a portion (for example, a first portion 121) of a flexible display 120 of the electronic device may be defined as a front surface of the electronic device 100, and the opposite surface of the front surface may be defined as a rear surface of the electronic device 100. A surface enclosing a space between the front surface and the rear surface may be defined as a side surface of the electronic device 100.

The flexible display 120 may be disposed on at least a portion of the electronic device 100 according to an embodiment. According to an embodiment, the flexible display 120 may be disposed to include at least some planar shape and at least some curved shape. According to an embodiment, the flexible display 120 and a slidable housing 110 enclosing at least a portion of a periphery of the flexible display 120 may be disposed on the front surface of the electronic device 100.

According to an embodiment, the slidable housing 110 may form some region of the front surface (for example, a surface of the electronic device 100 that faces in the +z direction of FIGS. 1A and 1B), the rear surface (for example, a surface of the electronic device 100 that faces in the −z direction of FIGS. 1A and 1B), and the side surface (for example, a surface connecting between the front surface and the rear surface of the electronic device 100). According to another embodiment, the slidable housing 110 may form some region of the side surface of the electronic device 100 and the rear surface.

According to an embodiment, the slidable housing 110 may include a first housing 111 and a second housing 112 which is coupled to be movable within a predetermined range with respect to the first housing 111.

According to an embodiment, the flexible display 120 may include the first portion 121 coupled to the second housing 112, and a second portion 122 which is extended from the first portion 121 and is drawn into the electronic device 100.

According to an embodiment, the electronic device 100 may include the first state 100a and the second state 100b. For example, the first state 100a and the second state 100b of the electronic device 100 may be determined according to a relative position of the second housing 112 with respect to the slidable housing 110, and the electronic device 100 may be configured to be changeable between the first state 100a and the second state 100b by a user operation or a mechanical operation.

According to an embodiment, the first state 100a of the electronic device 100 may refer to a state before the slidable housing 110 is extended. The second state 100b of the electronic device 100 may refer to a state in which the slidable housing 110 is extended.

According to an embodiment, when the electronic device 100 switches from the first state 100a to the second state 100b according to a movement of the second housing 112, the second portion 122 of the flexible display 120 may be drawn out (or exposed) from the inside of the electronic device 100 to the outside. According to an embodiment, the flexible display 120 being drawn out (or exposed) may mean that the flexible display 120 is viewable from the outside of the electronic device 100. In another embodiment, when the electronic device 100 switches from the second state 100b to the first state 100a according to a movement of the second housing 112, the second portion 122 of the flexible display 120 may be drawn into the electronic device 100. According to an embodiment, the flexible display 120 being drawn in may mean that the flexible display 120 is not viewable from the outside of the electronic device 100.

Figure 2A:
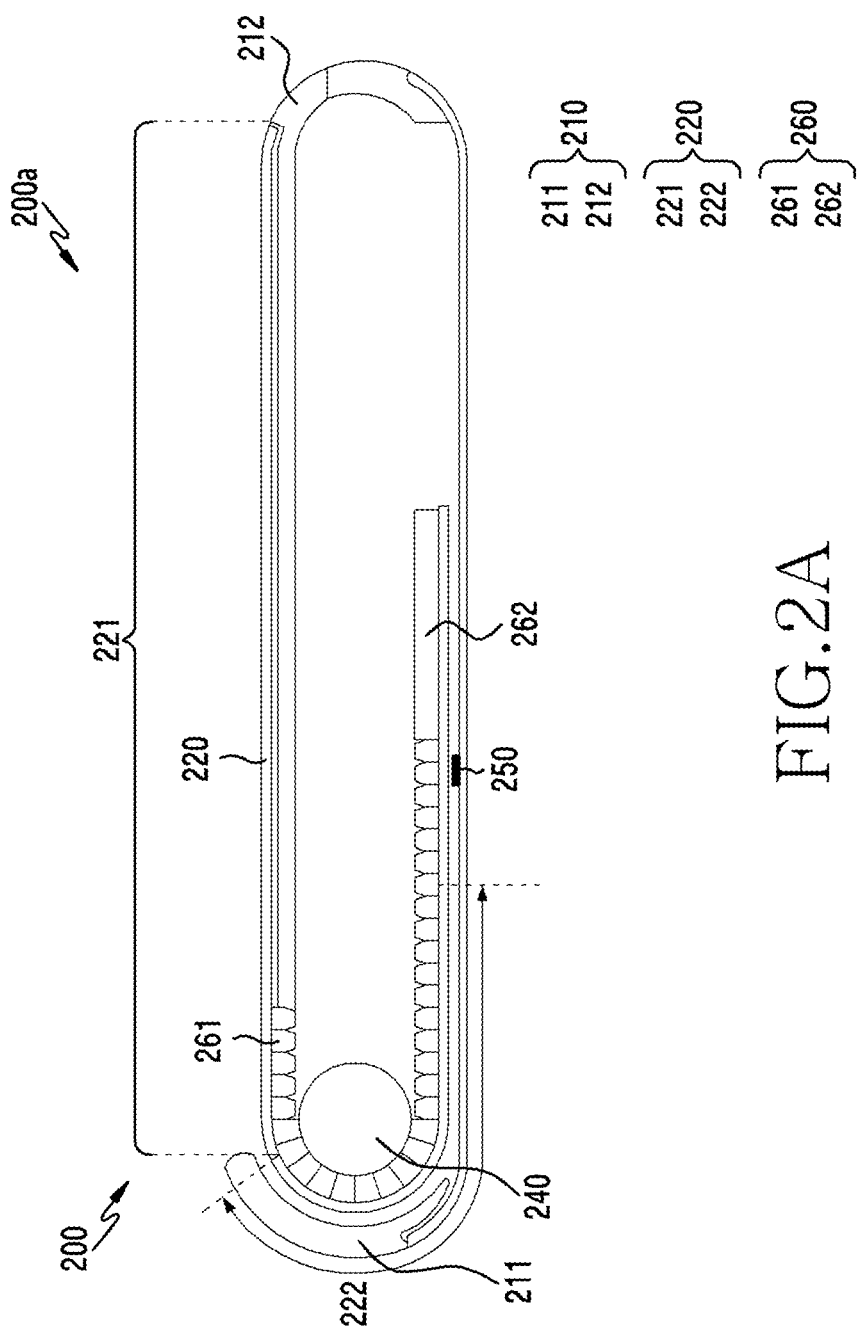
FIG. 2A illustrates a cross-sectional view of an electronic device in a first state (for example, a retracted state) according to another embodiment.
Figure 2B:
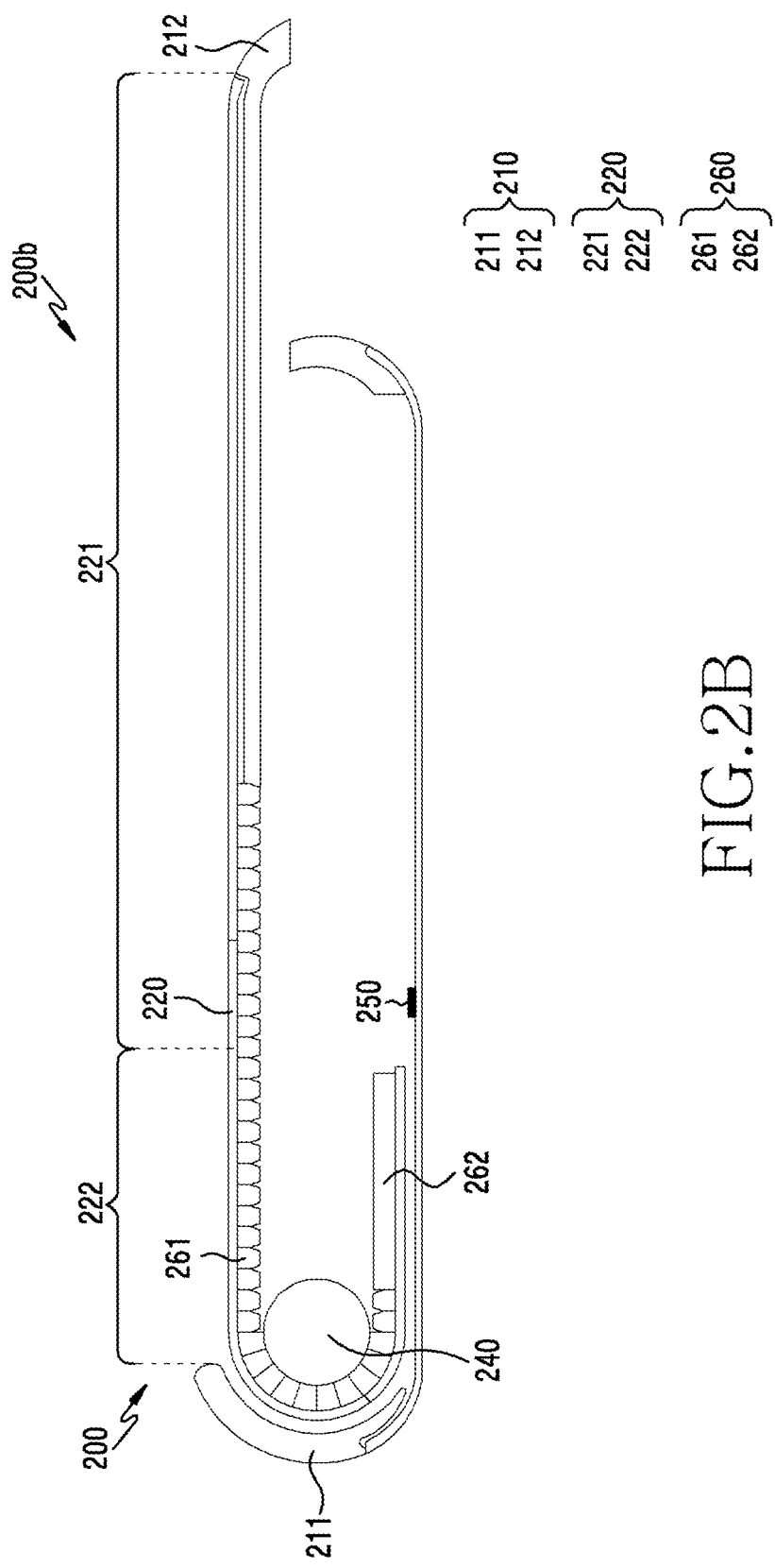
FIG. 2B illustrates a cross-sectional view of the electronic device in a second state (for example, an extended state) according to another embodiment.

FIG. 2A illustrates a cross-sectional view of an electronic device in a first state (for example, a retracted state) according to an embodiment. FIG. 2B illustrates a cross-sectional view of the electronic device in a second state (for example, an extended state) according to an embodiment. The descriptions of the electronic device 100 may be applied to the electronic device 200 described below.

According to an embodiment, the first state may be referred to as a first shape, and the second state may be referred to as a second shape. For example, the first shape may include a normal state, a retracted state, or a closed state, and the second shape may include an extended state or an open state.

Referring to FIGS. 2A and 2B, the electronic device 200 according to an embodiment may include a first housing 211, a second housing 212, a display 220, a roller 240, a sensor 250, and a rolling rail 260.

According to an embodiment, the first housing 211 may form a side surface and/or at least a portion of a rear surface of the electronic device 200. According to an embodiment, the second housing 212 may form a front surface and/or at least a portion of the side surface of the electronic device 200. According to an embodiment, the display 220 may be coupled with at least a portion of the second housing 212.

According to an embodiment, some region of the display 220 may be disposed to overlap the second housing 212. For example, at least some region of one surface of the display 220 may be positioned on at least some region of a front surface of the second housing 212, and the other surface may be disposed to be exposed to the outside.

According to an embodiment, the rolling rail 260 may include a plurality of joint structures 261 and a support plate 262. In an example, some region of the plurality of joint structures 261 may have its shape deformed in a process of switching the state of the electronic device 200. For example, some region of the plurality of structures 261 may be bent or unbent to have a designated curvature in a process in which the electronic device 200 switches from the first state 200a to the second state 200b or from the second state 200b to the first state 200a. According to another embodiment, the second housing 212 may be fixed to or coupled to one end of the plurality of joint structures 261, and a portion of a first portion 221 of the display 220 may be disposed on an upper end of the second housing 212. In another example, the support plate 262 may be fixed to or coupled to one end of the plurality of joint structures 261.

According to an embodiment, the roller 240 may be in contact with the plurality of joint structures 261 of the rolling rail 260, and the rolling rail 260 may move within a designated range by rotation of the roller 240. For example, when the roller 240 rotates in the clockwise direction in the process in which the electronic device 200 switches from the first state 200a to the second state 200b, some region of the plurality of structures 261 which has been bent may be unbent, and the rolling rail 260 may move in a first direction (for example, a direction of going away from the roller 240). In another example, when the roller 240 rotates in the counter clockwise direction in the process in which the electronic device 200 switches from the second state 200b to the first state 200a, some region of the plurality of joint structures 251 which has been unbent may be bent, and the rolling rail 260 may move in a second direction (for example, the opposite direction of the first direction). According to an embodiment, as the shape of some region of the plurality of joint structures 261 is deformed in the process in which the state of the electronic device 200 is changed, a shape of a second portion 222 of the display 220 supported by the plurality of joint structures 261 may be deformed to correspond to the shape of the plurality of joint structures 261.

According to an embodiment, the display 220 may be disposed on an outer circumference of the rolling rail 260, and the display 220 may move along the rolling rail 260 by the rotation of the roller 240. According to an embodiment, the display 220 may include the first portion 221 and/or the second portion 222 which has its shape deformed according to a state of the electronic device 200.

According to an embodiment, the first portion 221 of the display 220 may be positioned on upper ends of the second housing 212 and some region of the plurality of joint structures 261 to be supported by the second housing 212 and the plurality of joint structures 261. In an example, the first portion 221 of the display 220 may be exposed to the outside of the electronic device 200 regardless of a state (for example, the first state or the second state) of the electronic device 200.

According to an embodiment, the second portion 222 of the display 220 may be positioned on an upper end of some region of the plurality of joint structures 261 of the rolling rail 260 to be supported by the plurality of joint structures 261. In an example, the second portion 222 of the display 220 may be exposed or may not be exposed to the outside of the electronic device 200 according to a state of the electronic device 200.

For example, when the electronic device 200 is in the first state 200a, the second portion 222 of the display 220 may be supported by the plurality of joint structures 261, and may be received in an inner space of the electronic device 200 while being wound around a rotation shaft of the roller 240, and as a result, the second portion 222 may not be exposed to the outside of the electronic device 200. In another example, when the electronic device 200 switches from the first state 200a to the second state 200b, a region of the second portion 222 of the display 220 that is adjacent to the first portion 221 may be drawn out from the inside of the electronic device 200. As some region of the second portion 222 that is adjacent to the first portion 221 is drawn out from the inside of the electronic device 200, a display region of the display 220 exposed to the outside of the electronic device 200 may be extended. In another example, when the electronic device 200 is deformed from the second state 200b to the first state 200a, a region of the second portion 222 exposed to the outside of the electronic device 200 that is adjacent to the support plate 262 may be retracted into the electronic device 200. As some region of the second portion 222 that is adjacent to the support plate 262 is retracted into the electronic device 200, the display region of the display 220 exposed to the outside of the electronic device 200 may be reduced.

The electronic device 200 according to various embodiments is not limited to the configuration shown in FIGS. 2A and 2B. For example, the display 220 may be disposed to enclose most of the front surface of the electronic device 200 and a portion of the rear surface, such that some region of the display 220 is exposed to the outside on the rear surface even in the first state 200a.

According to an embodiment, at least one sensor 250 may be positioned in the electronic device 200. The electronic device 200 may detect a state change of the electronic device 200 by using the at least one sensor 250. The at least one sensor 250 according to an embodiment may include at least one of a hall sensor, a distance sensor, but is not limited thereto. For example, the at least one sensor 250 may include at least one of an optical sensor, an ultrasonic distance sensor, a propagation distance sensor to detect a state of the electronic device 200 (for example, a drawn-out, retracted state of the housing of the electronic device) or a moving distance of the second housing 212.

Figure 3:
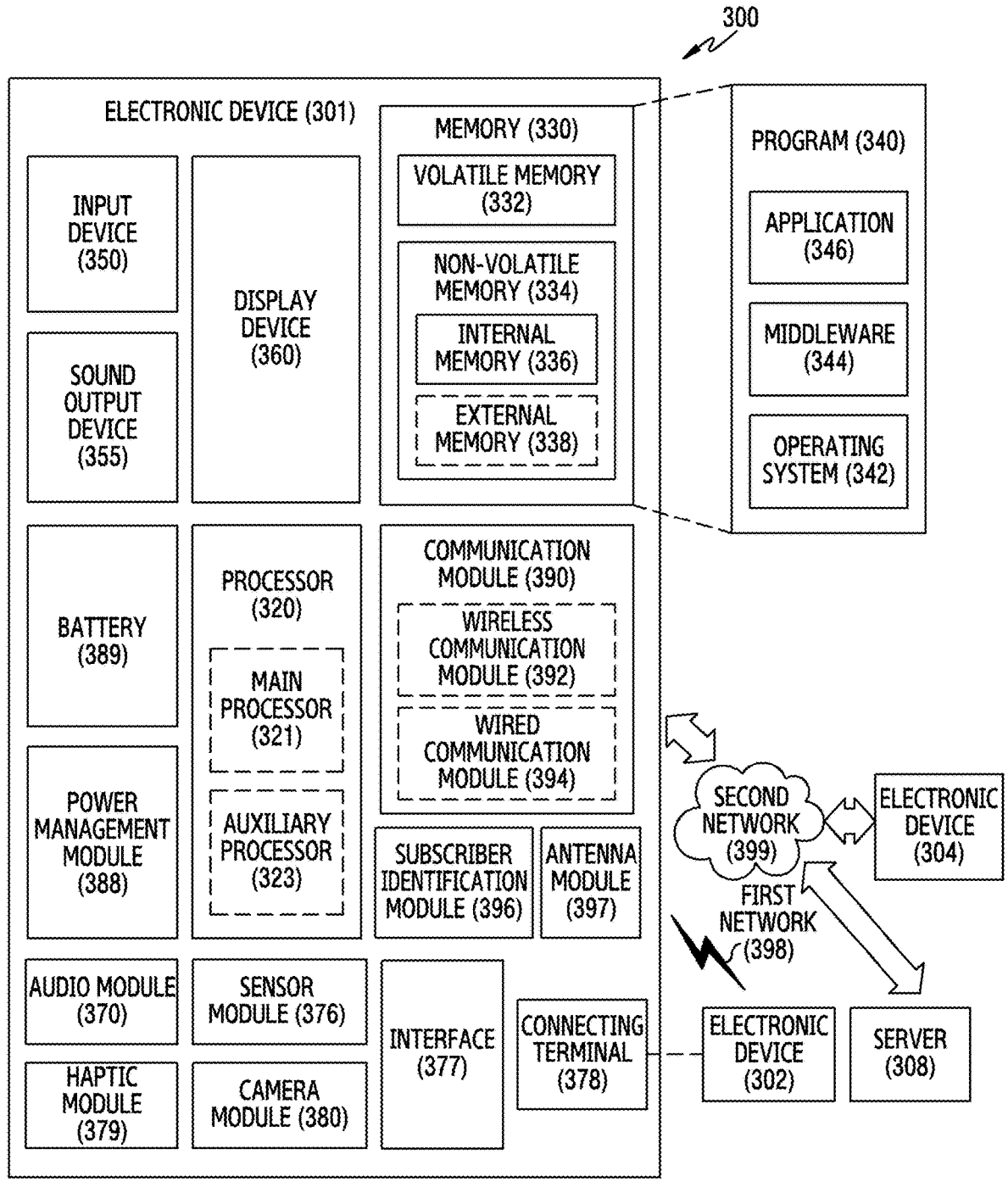
FIG. 3 illustrates a block diagram of an electronic device in another network environment according to an embodiment.

FIG. 3 illustrates a block diagram of an electronic device 301 in a network environment 300 according to various embodiments. Referring to FIG. 3, the electronic device 301 in the network environment 300 may communicate with an electronic device 302 via a first network 398 (e.g., a short-range wireless communication network), or at least one of an electronic device 304 or a server 308 via a second network 399 (e.g., a long-range wireless communication network). According to an embodiment, the electronic device 301 may communicate with the electronic device 304 via the server 308. According to an embodiment, the electronic device 301 may include a processor 320, memory 330, an input module 350, a sound output module 355, a display module 360, an audio module 370, a sensor module 376, an interface 377, a connecting terminal 378, a haptic module 379, a camera module 380, a power management module 388, a battery 389, a communication module 390, a subscriber identification module (SIM) 396, or an antenna module 397. In some embodiments, at least one of the components (e.g., the connecting terminal 378) may be omitted from the electronic device 301, or one or more other components may be added in the electronic device 301. In some embodiments, some of the components (e.g., the sensor module 376, the camera module 380, or the antenna module 397) may be implemented as a single component (e.g., the display module 360).

The processor 320 may execute, for example, software (e.g., a program 340) to control at least one other component (e.g., a hardware or software component) of the electronic device 301 coupled with the processor 320, and may perform various data processing or computation. According to one embodiment, as at least part of the data processing or computation, the processor 320 may store a command or data received from another component (e.g., the sensor module 376 or the communication module 390) in volatile memory 332, process the command or the data stored in the volatile memory 332, and store resulting data in non-volatile memory 334. According to an embodiment, the processor 320 may include a main processor 321 (e.g., a central processing unit (CPU) or an application processor (AP)), or an auxiliary processor 323 (e.g., a graphics processing unit (GPU), a neural processing unit (NPU), an image signal processor (ISP), a sensor hub processor, or a communication processor (CP)) that is operable independently from, or in conjunction with, the main processor 321. For example, when the electronic device 301 includes the main processor 321 and the auxiliary processor 323, the auxiliary processor 323 may be adapted to consume less power than the main processor 321, or to be specific to a specified function. The auxiliary processor 323 may be implemented as separate from, or as part of the main processor 321.

The auxiliary processor 323 may control at least some of functions or states related to at least one component (e.g., the display module 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). According to an embodiment, the auxiliary processor 323 (e.g., an image signal processor or a communication processor) may be implemented as part of another component (e.g., the camera module 380 or the communication module 390) functionally related to the auxiliary processor 323. According to an embodiment, the auxiliary processor 323 (e.g., the neural processing unit) may include a hardware structure specified for artificial intelligence model processing. An artificial intelligence model may be generated by machine learning. Such learning may be performed, e.g., by the electronic device 301 where the artificial intelligence is performed or via a separate server (e.g., the server 308). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 330 may store various data used by at least one component (e.g., the processor 320 or the sensor module 376) of the electronic device 301. The various data may include, for example, software (e.g., the program 340) and input data or output data for a command related thereto. The memory 330 may include the volatile memory 332 or the non-volatile memory 334. The program 340 may be stored in the memory 330 as software, and may include, for example, an operating system (OS) 342, middleware 344, or an application 346.

The input module 350 may receive a command or data to be used by another component (e.g., the processor 320) of the electronic device 301, from the outside (e.g., a user) of the electronic device 301. The input module 350 may include, for example, a microphone, a mouse, a keyboard, a key (e.g., a button), or a digital pen (e.g., a stylus pen).

The sound output module 355 may output sound signals to the outside of the electronic device 301. The sound output module 355 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 360 may visually provide information to the outside (e.g., a user) of the electronic device 301. The display module 360 may include, for example, a display, a hologram device, or a projector and control circuitry to control a corresponding one of the display, hologram device, and projector. According to an embodiment, the display module 360 may include a touch sensor adapted to detect a touch, or a pressure sensor adapted to measure the intensity of force incurred by the touch.

The audio module 370 may convert a sound into an electrical signal and vice versa. According to an embodiment, the audio module 370 may obtain the sound via the input module 350, or output the sound via the sound output module 355 or a headphone of an external electronic device (e.g., an electronic device 302) directly (e.g., wiredly) or wirelessly coupled with the electronic device 301.

The sensor module 376 may detect an operational state (e.g., power or temperature) of the electronic device 301 or an environmental state (e.g., a state of a user) external to the electronic device 301, and then generate an electrical signal or data value corresponding to the detected state. According to an embodiment, the sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 377 may support one or more specified protocols to be used for the electronic device 301 to be coupled with the external electronic device (e.g., the electronic device 302) directly (e.g., wiredly) or wirelessly. According to an embodiment, the interface 377 may include, for example, a high definition multimedia interface (HDMI), a universal serial bus (USB) interface, a secure digital (SD) card interface, or an audio interface.

A connecting terminal 378 may include a connector via which the electronic device 301 may be physically connected with the external electronic device (e.g., the electronic device 302). According to an embodiment, the connecting terminal 378 may include, for example, a HDMI connector, a USB connector, a SD card connector, or an audio connector (e.g., a headphone connector).

The haptic module 379 may convert an electrical signal into a mechanical stimulus (e.g., a vibration or a movement) or electrical stimulus which may be recognized by a user via his tactile sensation or kinesthetic sensation. According to an embodiment, the haptic module 379 may include, for example, a motor, a piezoelectric element, or an electric stimulator.

The camera module 380 may capture a still image or moving images. According to an embodiment, the camera module 380 may include one or more lenses, image sensors, image signal processors, or flashes.

The power management module 388 may manage power supplied to the electronic device 301. According to one embodiment, the power management module 388 may be implemented as at least part of, for example, a power management integrated circuit (PMIC).

The battery 389 may supply power to at least one component of the electronic device 301. According to an embodiment, the battery 389 may include, for example, a primary cell which is not rechargeable, a secondary cell which is rechargeable, or a fuel cell.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. The communication module 390 may include one or more communication processors that are operable independently from the processor 320 (e.g., the application processor (AP)) and supports a direct (e.g., wired) communication or a wireless communication. According to an embodiment, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module). A corresponding one of these communication modules may communicate with the external electronic device via the first network 398 (e.g., a short-range communication network, such as BLUETOOTH, wireless-fidelity (Wi-Fi) direct, or infrared data association (IrDA)) or the second network 399 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 392 may identify and authenticate the electronic device 301 in a communication network, such as the first network 398 or the second network 399, using subscriber information (e.g., international mobile subscriber identity (IMSI)) stored in the subscriber identification module 396.

The wireless communication module 392 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 392 may support a high-frequency band (e.g., the mmWave band) to achieve, e.g., a high data transmission rate. The wireless communication module 392 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 392 may support various requirements specified in the electronic device 301, an external electronic device (e.g., the electronic device 304), or a network system (e.g., the second network 399). According to an embodiment, the wireless communication module 392 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 397 may transmit or receive a signal or power to or from the outside (e.g., the external electronic device) of the electronic device 301. According to an embodiment, the antenna module 397 may include an antenna including a radiating element composed of a conductive material or a conductive pattern formed in or on a substrate (e.g., a printed circuit board (PCB)). According to an embodiment, the antenna module 397 may include a plurality of antennas (e.g., array antennas). In such a case, at least one antenna appropriate for a communication scheme used in the communication network, such as the first network 398 or the second network 399, may be selected, for example, by the communication module 390 (e.g., the wireless communication module 392) from the plurality of antennas. The signal or the power may then be transmitted or received between the communication module 390 and the external electronic device via the selected at least one antenna. According to an embodiment, another component (e.g., a radio frequency integrated circuit (RFIC)) other than the radiating element may be additionally formed as part of the antenna module 397.

According to various embodiments, the antenna module 397 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band. At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 301 and the external electronic device 304 via the server 308 coupled with the second network 399. Each of the electronic devices 302 or 304 may be a device of a same type as, or a different type, from the electronic device 301. According to an embodiment, all or some of operations to be executed at the electronic device 301 may be executed at one or more of the external electronic devices 302, 304, or 308. For example, if the electronic device 301 should perform a function or a service automatically, or in response to a request from a user or another device, the electronic device 301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 301. The electronic device 301 may provide the outcome, with or without further processing of the outcome, as at least part of a reply to the request. To that end, a cloud computing, distributed computing, mobile edge computing (MEC), or client-server computing technology may be used, for example. The electronic device 301 may provide ultra low-latency services using, e.g., distributed computing or mobile edge computing. In another embodiment, the external electronic device 304 may include an internet-of-things (IoT) device. The server 308 may be an intelligent server using machine learning and/or a neural network. According to an embodiment, the external electronic device 304 or the server 308 may be included in the second network 399. The electronic device 301 may be applied to intelligent services (e.g., smart home, smart city, smart car, or healthcare) based on 5G communication technology or IoT-related technology.

Figure 4:
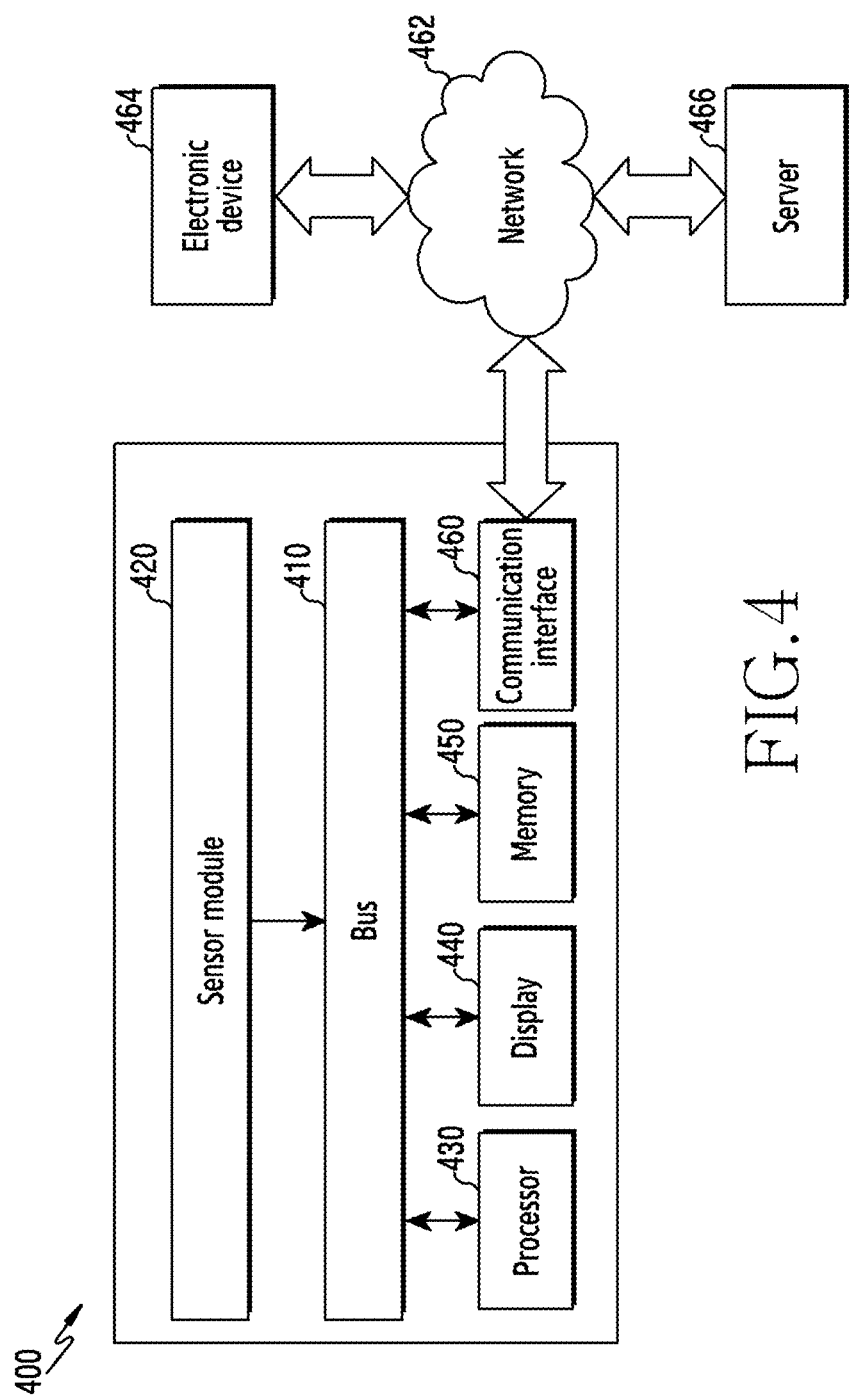
FIG. 4 illustrates a block diagram of hardware of an electronic device according to an embodiment.

FIG. 4 illustrates a block diagram of hardware of an electronic device according to an embodiment.

Referring to FIG. 4, the electronic device 400 (for example, the electronic device 100 of FIGS. 1A and 1B or the electronic device 200 of FIGS. 2A and 2B, or the electronic device 301 of FIG. 3) may include a bus 410, a sensor module 420, a processor 430, a display 440, a memory 450, and a communication interface 460. In various embodiments, the electronic device 400 may include additional components in addition to the components illustrated in FIG. 4 or may omit at least one of the components illustrated in FIG. 4.

According to an embodiment, the bus 410 may include, for example, a circuit which connects the components (for example, 420 to 460) with one another and transmits signals (for example, a control message and/or data) between components.

According to an embodiment, the sensor module 420 may include at least one of a time of flight (ToF) sensor, a slide sensor, a light sensor, a hall sensor, a motion sensor, but is not limited thereto. According to an embodiment, the sensor module 420 may include at least one of an optical sensor, an ultrasonic distance sensor, a propagation distance sensor which detects a state of the electronic device 400 or a moving distance of a housing. According to an embodiment, the sensor module 420 may transmit a signal detected through at least one sensor through the bus 410.

According to an embodiment, the processor 430 may perform computation or data processing related to control and/or communication of at least one other component of the electronic device 400. According to an embodiment, the processor 510 may include at least one of a central processing unit (CPU), a graphic processing unit (GPU), a micro controller unit (MCU), a sensor hub, a supplementary processor, a communication processor, an application processor, an application specific integrated circuit (ASIC), field programmable gate arrays (FPGA), and may have a plurality of cores.

According to an embodiment, the processor 430 may identify attributes of a plurality of contents including a first content and a second content. For example, the attribute of a content may include at least one of a size of a window in which the content is displayed, a designated priority given to the content. According to an embodiment, the processor 430 may selectively control a resolution of the content based on the attribute of the content when a state of the electronic device 400 is changed. Operations of the processor 430 will be described in detail below with reference to FIGS. 6A, 6B, 7, 8, 9, and 10.

According to an embodiment, the memory 450 may include a volatile memory and/or a nonvolatile memory. According to an embodiment, the memory 450 may store a command or data related to at least one other component of the electronic device 400. For example, the memory 450 may store a command or data received from the processor 430 or generated by the processor 430 or other components. According to an embodiment, the memory 450 may store state information of the electronic device 400, which is acquired by using at least one sensor included in the sensor module 420, as information including at least one of a static value and a dynamic state. For example, the memory 450 may store a value corresponding to an area of a display region exposed to the outside, and may store a value corresponding to a moving distance of a second housing which moves with respect to a first housing. In another example, the memory 450 may store a state of the electronic device 400 as information corresponding to one of a fully contracted state, a fully extended state, a partially extended state, a partially contracted state.

According to an embodiment, the display 440 may display various contents (for example, a text, an image, a video, an icon, and/or a symbol) for a user. For example, the display 440 may include a touch screen. According to an embodiment, the display 440 may receive a touch, a gesture, an approach or a hovering input using an electronic pen or a portion of user's body.

The communication interface 460 may establish communication between the electronic device 400 and an external electronic device 464 or a server 466. For example, the communication interface 460 may be connected to a network 462 through wireless communication or wired communication to communicate with the external electronic device 464 or the server 466. For example, the communication interface 460 may communicate with the external electronic device 464 through short-range communication.

Figure 5:
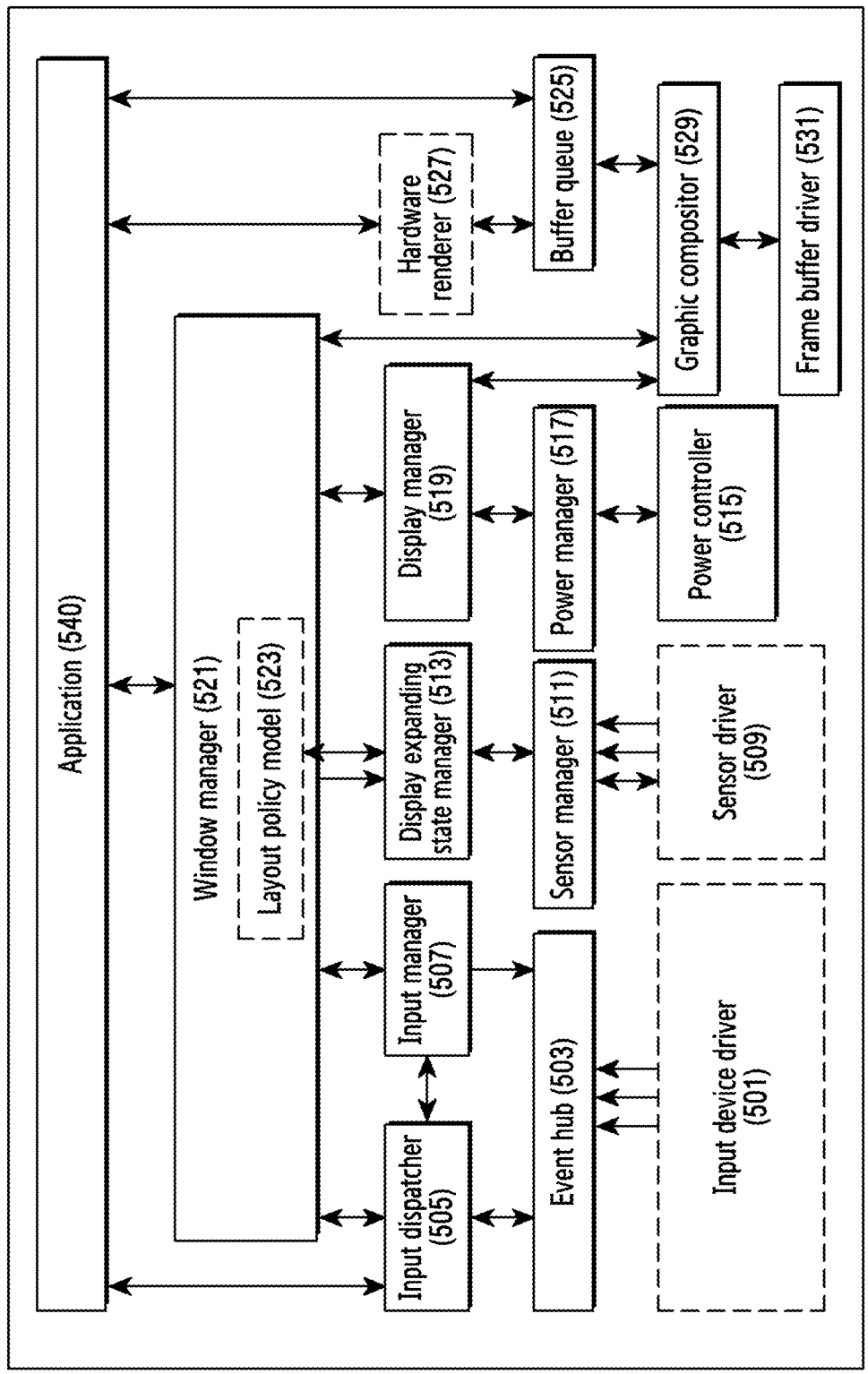
FIG. 5 illustrates a block diagram of a software module according to an embodiment.

FIG. 5 illustrates a block diagram of a software module according to an embodiment.

Referring to FIG. 5, the software module of the electronic device 400 may include an input device driver 501, an event hub 503, an input dispatcher 505, an input manager 507, a sensor driver 509, a sensor manager 511, a display expanding state manager 513, a power controller 515, a power manager 517, a display manager 519, a window manager 521, a layout policy module 523, a buffer queue 525, a hardware renderer 527, a graphic compositor 529, a frame buffer driver 531, an application 540. For example, the processor 430 of the electronic device 400 may implement various software modules explained in FIG. 5 by executing a program or instructions stored in the memory 450.

In various embodiments, the electronic device 400 may include additional components in addition to the components illustrated in FIG. 5, or may omit at least one of the components illustrated in FIG. 5.

According to an embodiment, the input device driver 501 may receive various inputs. For example, the input device driver 501 may receive a touch input, a key input, a mouse input. According to an embodiment, the input device driver 501 may be omitted.

According to an embodiment, the event hub 503 may receive events generated in various modules such as a touch module and a sensor module, and may convert an event into a standard input event of an operating system (OS).

According to an embodiment, the input dispatcher 505 may dispatch or transmit an input event to a system and/or an event processing module of an application.

According to an embodiment, the input manager 507 may provide information of an input device, and may configure viewport information of the display for interpreting raw data acquired from the input device. According to an embodiment, the viewport of the display may refer to resolution information of the display. For example, the viewport may refer to information for converting a value (for example, a physical distance) inputted from the input device into a pixel corresponding a resolution of the display.

According to an embodiment, the sensor driver 509 may control various sensors such as a ToF sensor, a light sensor, a bending sensor, a hall sensor, a motion sensor to detect an extended state of the display. According to an embodiment, the sensor driver 509 may provide information related to a state change of the electronic device to the sensor manager 511.

According to an embodiment, the sensor manager 511 may convert an event generated in various sensors into a standardized sensor event which is suitable in the OS through a conversion process such as fusing, and may control the event.

According to an embodiment, the display expanding state manager 513 may analyze at least one sensor event, may determine a current extended state of the display, and may provide information to a module requesting the information. According to an embodiment, the display expanding state manager 513 may control to stop or resume transmitting an input event through the input manager 507 according to an extended state of the display.

According to an embodiment, the power controller 515 may control power supplied to a system circuit such as a CPU or a bus (for example, the bus 410 of FIG. 4), and the display.

According to an embodiment, the power manager 517 may manage at least one of capacity of a battery, temperature, and power based on a system state, and may determine or provide relevant information for operations of the electronic device by using corresponding information.

According to an embodiment, the display manager 519 may manage hardware display mapping to output a lifespan of the electronic device and a screen GUI element. According to an embodiment, the display manager 519 may change the display to be outputted by a system event.

According to an embodiment, the window manager 521 may manage at least one GUI resource used on the screen. According to an embodiment, the window manager 521 may change a size of a window in response to information related to a state change of the electronic device being received.

According to an embodiment, the layout policy module 523 may control a window layout according to an extended state of the display. For example, the layout policy module 523 may control at least one of a position, a size, rotation processing of the layout.

According to an embodiment, the buffer queue 525 may control a memory buffer for transmitting graphic data acquired from a producer such as an application to the graphic compositor 529.

According to an embodiment, the hardware renderer 527 may be an acceleration module to input various graphic elements generated in an application to the buffer queue 525 to transmit to the graphic compositor 529.

According to an embodiment, the graphic compositor 529 may combine graphic bitmap information acquired from various sources, and may output one piece of bitmap information to be outputted to the display.

According to an embodiment, the frame buffer driver 531 may control a buffer containing graphic information to be outputted to the display.

Figure 6A:
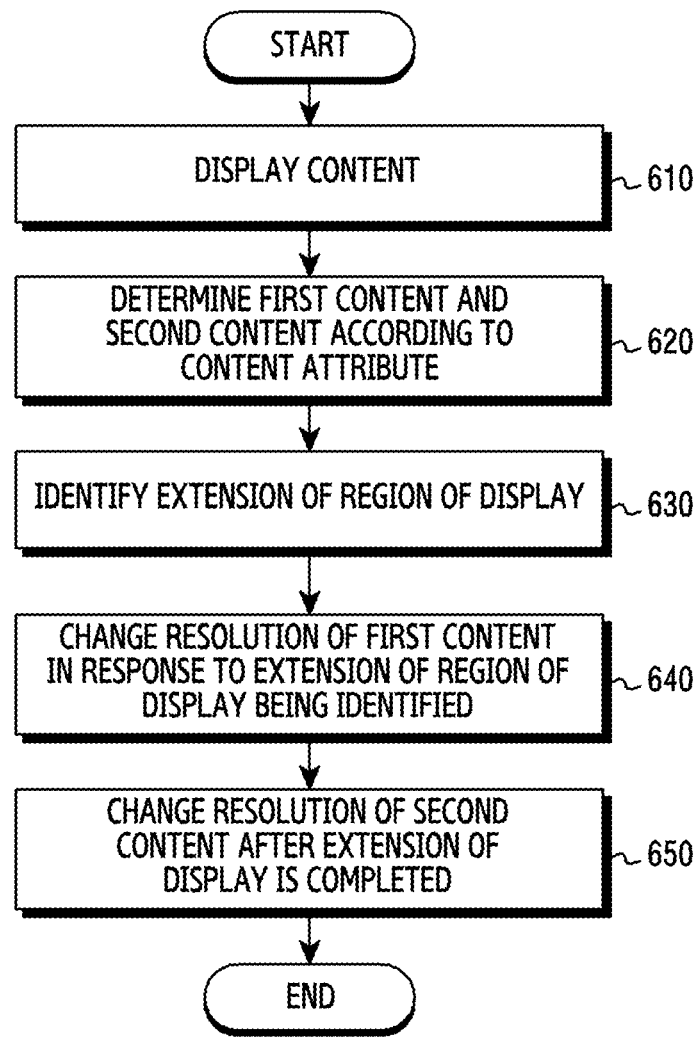
FIG. 6A illustrates a flowchart of an operation of selectively changing a resolution according to a content attribute in an electronic device according to an embodiment.

FIG. 6A illustrates a flowchart of an operation of selectively changing a resolution according to a content attribute in an electronic device according to an embodiment. In the following embodiment, respective operations may be performed in sequence, but may not necessarily be performed in sequence. For example, the sequence of the respective operations may be changed and at least two operations may be performed in parallel.

Referring to FIG. 6A, in operation 610, a processor (for example, the processor 430 of FIG. 4) according to an embodiment may display at least one content through a display (for example, the display 440 of FIG. 4). According to an embodiment, the content displayed on the display 440 may include an image, a text, a video, contacts, an audio, an icon, an item, a tab, or a combination of these. According to an embodiment, a window in which the content is displayed may have a fixed size or may have a variable size in proportion to a size of the content. For example, the window may include at least one of a page in which the content is displayed, a list view, a document, and a frame.

According to an embodiment, in operation 620, the processor 430 may determine a first content and a second content based on a content attribute. For example, the content attribute may include at least one of a size of the window in which the content is displayed, a priority given to the content (for example, an order of processing).

According to an embodiment, the electronic device 400 may be extended in a first direction (for example, a horizontal direction). According to an embodiment, the processor 430 may determine, as the first content, a content displayed on the window a first direction length (for example, a horizontal length) of which is equal to or longer than a first direction length of a display region of the display exposed to the outside in a first state (for example, a contracted state). According to another embodiment, the electronic device 400 may be extended in a third direction (for example, a vertical direction). According to an embodiment, the processor 430 may determine, as the first content, a content displayed on the window a third direction length (for example, a vertical length) of which is equal to or longer than a third direction length of the display region of the display exposed to the outside in the first state.

According to another embodiment, the processor 430 may determine a content having a high designated priority as the first content, and may determine a content having a designated priority lower than the first content as the second content.

According to an embodiment, in operation 630, the processor 430 may identify that the display region exposed to the outside of the electronic device is extended. According to an embodiment, the processor 430 may detect a change of capacitance when the display moves, by using a touch sensor disposed on a sliding section or a roller (for example, the roller 240 of FIGS. 2A and 2B) of the electronic device 400. According to an embodiment, the processor 430 may detect a movement of the second housing with respect to the first housing through a light sensor such as a ToF sensor or a proximity sensor. According to an embodiment, the processor 430 may detect a movement amount by using a hall sensor which detects magnetism. According to an embodiment, the processor 430 may detect a movement amount by using a predetermined number of magnets disposed on a sliding portion, or may detect the number of rotations of the roller by using magnets disposed on the roller 240, and may calculate a sliding length through multiplication of the number of rotations and a circumference of the roller. According to an embodiment, the processor 430 may have a wire disposed on the sliding section, and may calculate a resistance value, which is variable according to a change in the length of the wire. According to an embodiment, the processor 430 may detect a change in sliding by using a motion sensor such as an acceleration sensor or a gyro sensor.

According to an embodiment, in operation 640, the processor 430 may change a resolution of the first content in response to it being identified that the display region is extended. According to an embodiment, when the electronic device changes from the first state (for example, the contracted state) to the second state (for example, the extended state) and the size of the display region of the display exposed to the outside increases, the processor 430 may change the resolution of the first content in response to the size of the display increasing. According to the above-descried embodiment, the electronic device 400 may change the resolution of the window constituting a background layer according to a change in the size of the display region, so that a natural and fast graphic effect can be provided to the user.

According to an embodiment, in operation 650, the processor 430 may change a resolution of the second content after the extension of the display is completed. According to an embodiment, the processor 430 may determine a state of the electronic device. For example, the processor 430 may determine whether the electronic device is partially extended or is fully extended, by using a hall integrated circuit (IC). According to an embodiment, when it is determined that a predetermined time is elapsed after the extension of the display is stopped, the processor 430 may change the resolution of the second content according to the size of the extended display.

Figure 6B:
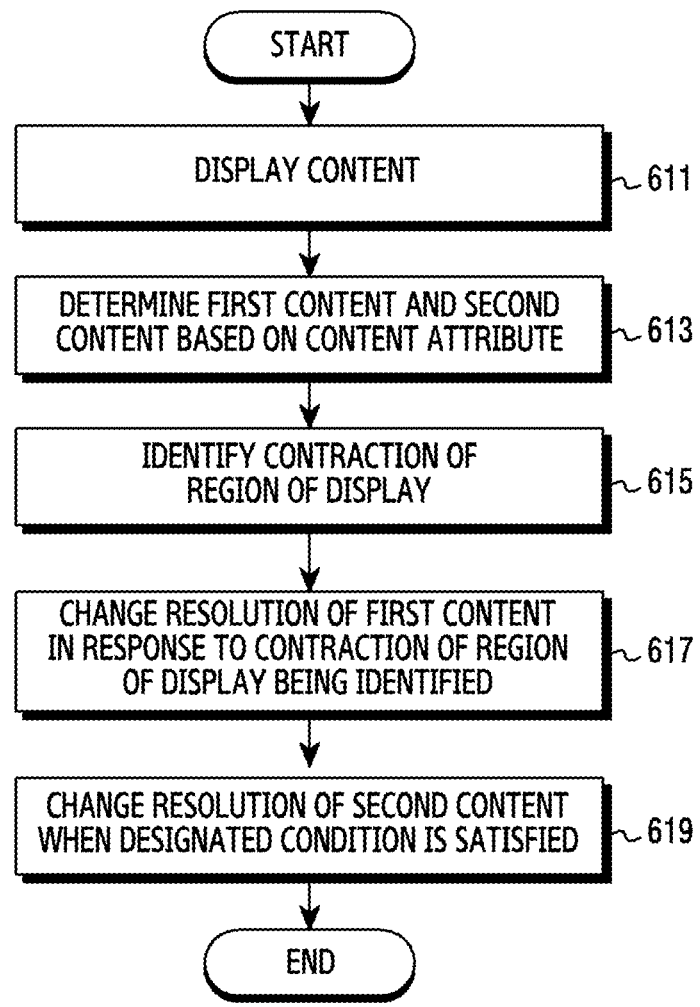
FIG. 6B illustrates a flowchart of an operation of selectively changing a resolution according to a content attribute in an electronic device according to another embodiment.

FIG. 6B illustrates a flowchart of an operation of selectively changing a resolution according to a content attribute in an electronic device according to another embodiment. Regarding FIG. 6B, descriptions similar to or corresponding to the above descriptions may be made brief or may be omitted.

In operation 611, a processor (for example, the processor 430 of FIG. 4) according to an embodiment may display at least one content through a display (for example, the display 440 of FIG. 4). According to an embodiment, the content displayed on the display 440 may include an image, a text, a video, contacts, an audio, an icon, an item, a tab, or a combination of these. According to an embodiment, a window in which the content is displayed may have a fixed size or may have a variable size in proportion to a size of the content. For example, the window may include at least one of a page in which the content is displayed, a list view, a document, a frame.

According to an embodiment, in operation 613, the processor 430 may determine a first content and a second content based on a content attribute. According to an embodiment, the electronic device 400 may be contracted in a second direction (for example, the opposite direction of the first direction of FIG. 6A). According to an embodiment, the processor 430 may determine, as the first content, a content displayed on the window a second direction length (for example, a horizontal length) of which is equal to or longer than a second direction length of the display region of the display exposed to the outside in the second state (for example, the extended state). According to another embodiment, the electronic device 400 may be contracted in a fourth direction (for example, the opposite direction of the third direction of FIG. 6A). According to an embodiment, the processor 430 may determine, as the first content, a content displayed on the window a fourth direction length (for example, a vertical direction) of which is equal to or longer than a fourth direction length of the display region of the display exposed to the outside in the second state.

According to another embodiment, the processor 430 may determine a content having a high designated priority as the first content, and may determine a content having a priority lower than the first content as the second content.

According to an embodiment, in operation 615, the processor 430 may identify that the region of the display exposed to the outside is contracted. According to an embodiment, the processor 430 may determine a size of the contracted region of the display by using at least one sensor of a touch sensor, a ToF sensor, a proximity sensor, a hall sensor.

According to an embodiment, in operation 617, the processor 430 may change a resolution of the first content to correspond to the size of the contracted display region in response to it being identified that the display region is contracted. According to an embodiment, when the electronic device 400 changes from the second state (for example, the extended state) to the first state (for example, the contracted state) and the size of the display exposed to the outside is reduced, the processor 430 may change the resolution of the first content according to the reduced display size. According to the above-described embodiment, the electronic device 400 may change a resolution of the window constituting a background layer according to a change of the size of the display region, so that a natural graphic can be provided to the user.

According to an embodiment, in operation 619, the processor 430 may change a resolution of the second content when a designated condition is satisfied. According to an embodiment, when the electronic device 400 in the second state (for example, the extended state) is contracted in the second direction (for example, the opposite direction of the first direction of FIG. 6A), the processor 430 may change the resolution of the second content according to the size of the contracted display region from the time when the second direction length of the window in which the content is displayed is equal to or longer than the second direction length of the display region of the display exposed to the outside.

According to another embodiment, when the electronic device 400 is contracted in the fourth direction (for example, the opposite direction of the third direction of FIG. 6A), the processor 430 may change the resolution of the second content according to the size of the contracted display region at the time when the fourth direction length of the window in which the content is displayed is equal to or longer than the fourth direction length of the display region of the display exposed to the outside.

Figure 7:
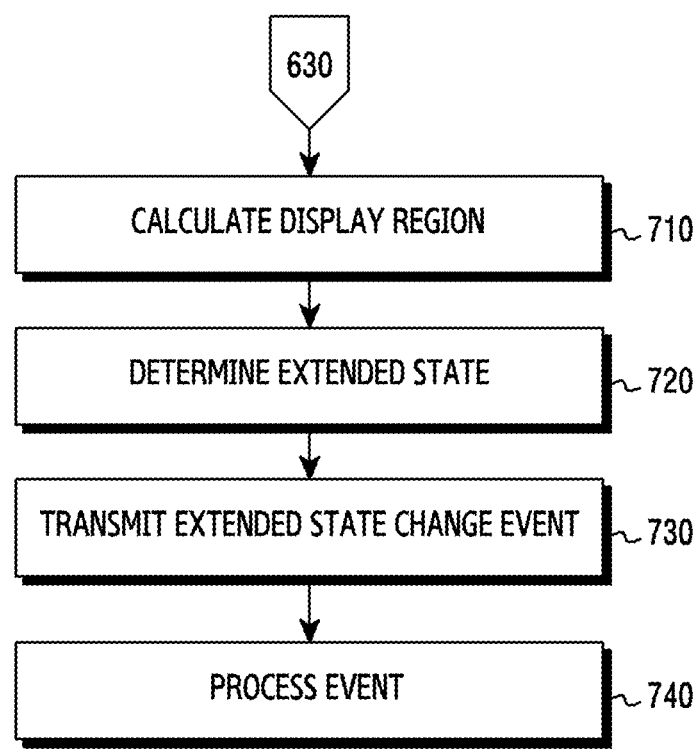
FIG. 7 illustrates a flowchart of an operation of processing an event according to an extended state of a display in an electronic device according to an embodiment.

FIG. 7 illustrates a flowchart of an operation of processing an event according to an extended state of a display in an electronic device according to an embodiment. Regarding FIG. 7, descriptions similar to or corresponding to the above descriptions may be made brief or may be omitted, and operations illustrated in FIG. 7 may be performed after operation 630 of FIG. 6A.

Referring to FIG. 7, in operation 710, the processor 430 according to an embodiment may calculate a size of a display region exposed to the outside, based on an extended state of the electronic device. According to an embodiment, the processor 430 may determine the extended state of the display by analyzing raw data of various sensors through an event converter. For example, the event converter may calculate the display region exposed to the outside by analyzing raw data acquired from one of a ToF sensor, an illuminance sensor or a proximity sensor, a bending sensor.

According to an embodiment, in operation 720, the processor 430 may determine an extended state of the display. According to an embodiment, the processor 430 may determine information corresponding to the extended state of the display, which is determined through the event converter, as a static value and/or a dynamic state. For example, the static value may include at least one of a size of the display region, a moving distance of the second housing with respect to the first housing. In another example, the dynamic state may include at least one of a fully contracted state, a partially extended state, a fully extended state, and a partially contracted state.

According to an embodiment, in operation 730, the processor 430 may transmit an event related to a change of the extended state of the electronic device. According to an embodiment, the processor 430 may provide a state change event of the electronic device to a system module based on a system state. Alternatively, the processor 430 according to an embodiment may provide the state change event to all system modules and/or an application module based on the system state. According to an embodiment, in an operation of continuously refining a size of a window, the processor 430 may temporarily limit provision of the state change event of the electronic device, based on information regarding occurrence of a load in the operation of the processor 430.

According to an embodiment, in operation 740, the processor 430 may process the event related to the change of the extended state of the electronic device. According to an embodiment, the processor 430 may process a registered handler according to a priority. For example, the handler may be registered by various modules such as a system module, an application module, a background service module. According to an embodiment, the processor 430 may process the event at the handler having a high priority, and may stop transmitting the event to the remaining handler. According to another embodiment, when the event is not processed at the handler having the high priority, the processor 430 may process the event at the handler of the next priority.

Figure 8:
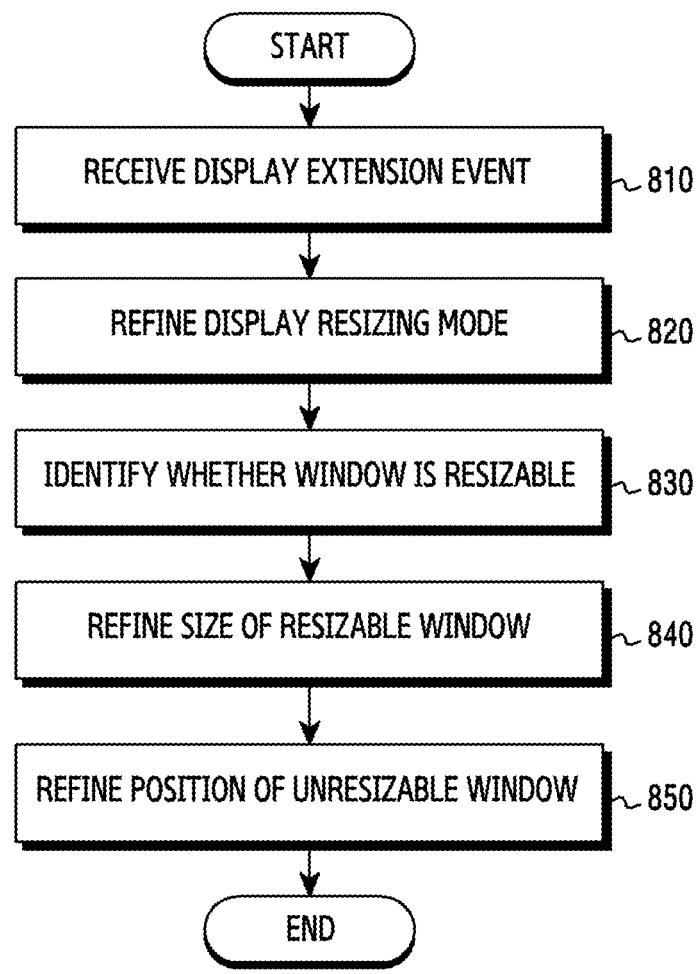
FIG. 8 illustrates a flowchart of an operation of refining a size of a window on which a content is displayed in an electronic device according to an embodiment.

FIG. 8 illustrates a flowchart of an operation of refining a size of a window in which a content is displayed in an electronic device according to an embodiment. Regarding FIG. 8, descriptions similar to or corresponding to the above descriptions may be made brief or may be omitted.

Referring to FIG. 8, in operation 810, the processor 430 according to an embodiment may receive an extension event of the display. For example, the processor 430 may detect an extension of the display by using a sensor such as a ToF sensor, a slide sensor, a light sensor, a hall sensor, a motion sensor.

According to an embodiment, in operation 820, the processor 430 may refine a display resizing mode. According to an embodiment, the display resizing mode may refer to a mode in which the processor 430 refines an attribute of the window (for example, a size of the window) displaying a screen when the display is in the state of being extended. According to an embodiment, the processor 430 may turn on the display resizing mode when a display extension event is received.

According to an embodiment, in operation 830, the processor 430 may determine whether it is possible to change the size of each window. According to an embodiment, when it is determined that the display is in the state of being extended, the processor 430 may determine whether it is possible to change the size of at least one window displayed on the display. For example, the method of determining may include at least one of a method of comparing pixel values of the window and the display, and a method of comparing the size of the window with a size designated as a match parent.

According to an embodiment, in operation 840, the processor 430 may refine the size of the window that is determined as being resizable. According to an embodiment, the processor 430 may determine, as the resizable window, a window the length of which in an extension direction of the display is equal to or longer than a length of the display in the same direction. According to another embodiment, the processor 430 may determine, as the resizable window, a window the length of which in the extension direction of the display is equal to a designated match parent. According to an embodiment, the processor 430 may change the size of the window that is determined as being resizable according to the size of the extended display.

According to an embodiment, in operation 850, the processor 430 may refine a position of a window that is determined as not being resizable. According to an embodiment, the processor 430 may determine, as a unresizable window, a window the length of which in the extension direction of the display is shorter than the length of the display in the same direction. According to another embodiment, the processor 430 may determine, as the unresizable window, a window the length of which in the extension direction of the display is not equal to a designated match parent. According to an embodiment, the processor 430 may change a position of the window that is determined as being unresizable while the state of the electronic device is being changed. According to an embodiment, the processor 430 may change definition of the window while the state of the electronic device is being changed. For example, the processor 430 may control to display the window blurredly while the size of the display is being extended.

Figure 9:
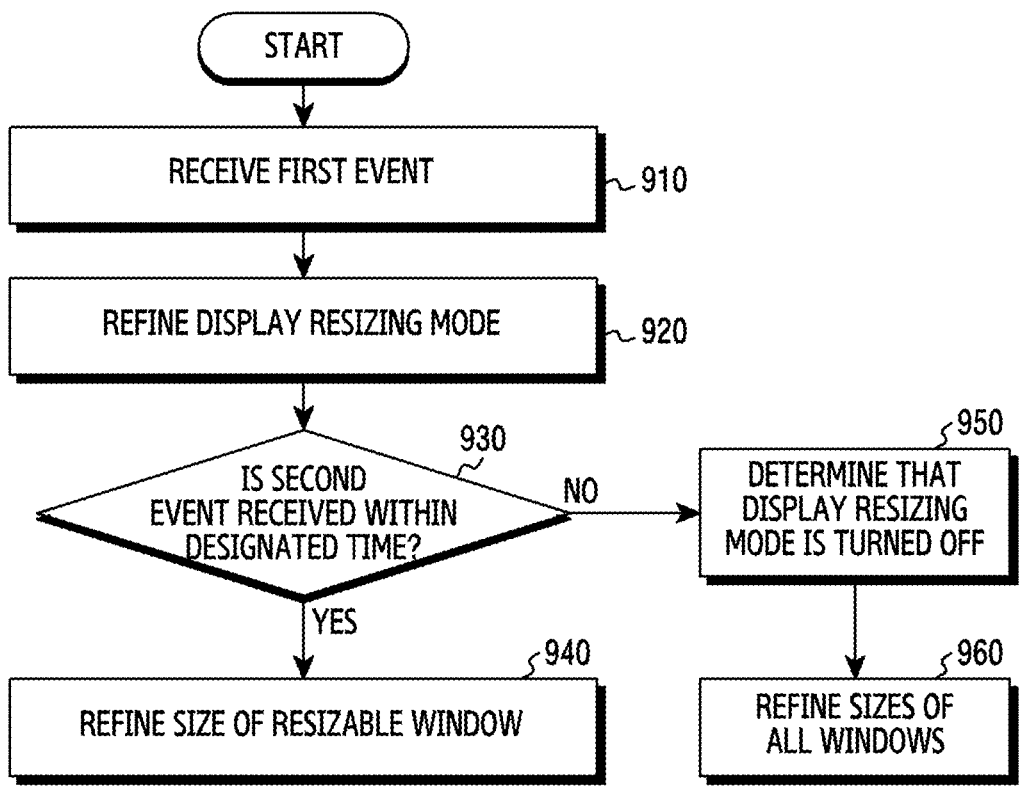
FIG. 9 illustrates a flowchart of an operation of refining a resizing mode of a display in an electronic device according to an embodiment.

FIG. 9 illustrates a flowchart of an operation of refining a resizing mode of a display of an electronic device according to an embodiment.

Referring to FIG. 9, in operation 910, the processor 430 according to an embodiment may receive a first event in which the size of the display starts to change. According to an embodiment, the first event may include extension of the electronic device in the first state (for example, the first state 100a of FIG. 1A or the first state 200a of FIG. 2A. For example, the processor 430 may detect the electronic device being extended by using at least one sensor of a ToF sensor, a slide sensor, a light sensor, a hall sensor, a motion sensor.

According to an embodiment, in operation 920, the processor 430 may refine a display resizing mode. According to an embodiment, the processor 430 may turn on the display resizing mode when it is determined that the electronic device is being extended.

According to an embodiment, in operation 930, the processor 430 may determine whether a second event in which the size of the display is changed is received within a designated time. For example, the electronic device may receive the second event through a sensor for detecting a change of the size of the display while the electronic device is changing from the first state (for example, the first state 100a of FIG. 1A or the first state 200a of FIG. 2A) to the second state (the second state 100b of FIG. 1B or the second state 200b of FIG. 2B).

According to an embodiment, in operation 940, the processor 430 may refine a size of a window that is determined as being resizable when the second event is received within the designated time. According to an embodiment, when it is detected that the size of the display region exposed to the outside is being changed through a sensor module within the designated time, the processor 430 may refine the size of the resizable window according to the size of the display region.

According to an embodiment, in operation 950, when the second event is not received within the designated time, the processor 430 may determine that the display resizing mode is turned off. For example, when the event in which the size of the display is changed does not occur within the designated time, the processor 430 may determine that the extension is completed and may determine that the resizing mode is turned off.

According to an embodiment, in operation 960, when it is determined that the display resizing mode is turned off, the processor 430 may refine the sizes of all windows. According to an embodiment, when it is determined that the extension of the display is completed, the processor 430 may refine resolutions of all windows displaying a content according to the size of the display.

Figure 10:
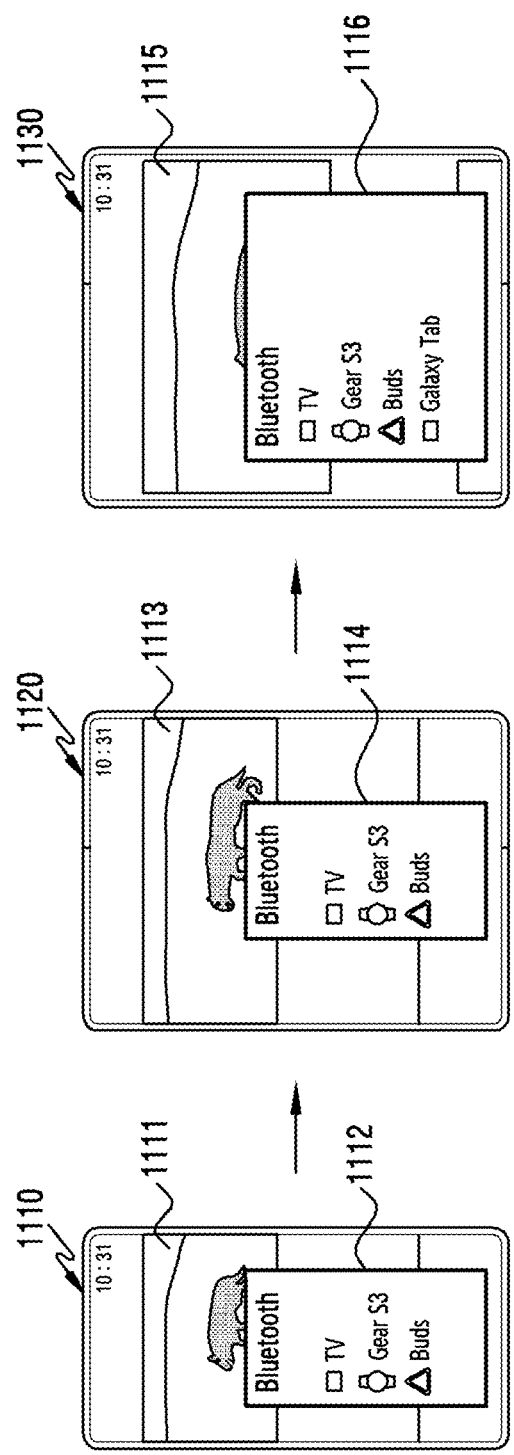
FIG. 10 illustrates a view of a resolution change of each content when an electronic device is extended according to an embodiment.

FIG. 10 illustrates a view of a change of a resolution of each content when an electronic device is extended according to an embodiment.

Referring to FIG. 10, the processor 430 according to an embodiment may display at least one content including a first content 1111 and a second content 1112 in a first state 1110 (for example, a contracted state). For example, the first content 1111 may be a content constituting some of background layers, and the second content 1112 may be a content that does not correspond to the background layers, like a dialog window, a list.

According to an embodiment, the processor 430 may display the first content 1113 the resolution of which is changed in a second state (for example, a partially extended state). According to an embodiment, the processor 430 may change the resolution of the first content 1113 based on the second state 1120. According to an embodiment, the processor 430 may display the second content 1114 the resolution of which is not changed. According to an embodiment, the processor 430 may change a position or definition of the second content 1114 while the electronic device is changing from the first state 1110 to the second state 1120.

According to an embodiment, the processor 430 may display the first content 1115 the resolution of which is changed and the second content 1116 the resolution of which is changed in a third state 1130 (for example, a fully extended state). According to an embodiment, the processor 430 may change the resolutions of the first content 1115 and the second content 1116, based on the third state 1130.

Figure 11:
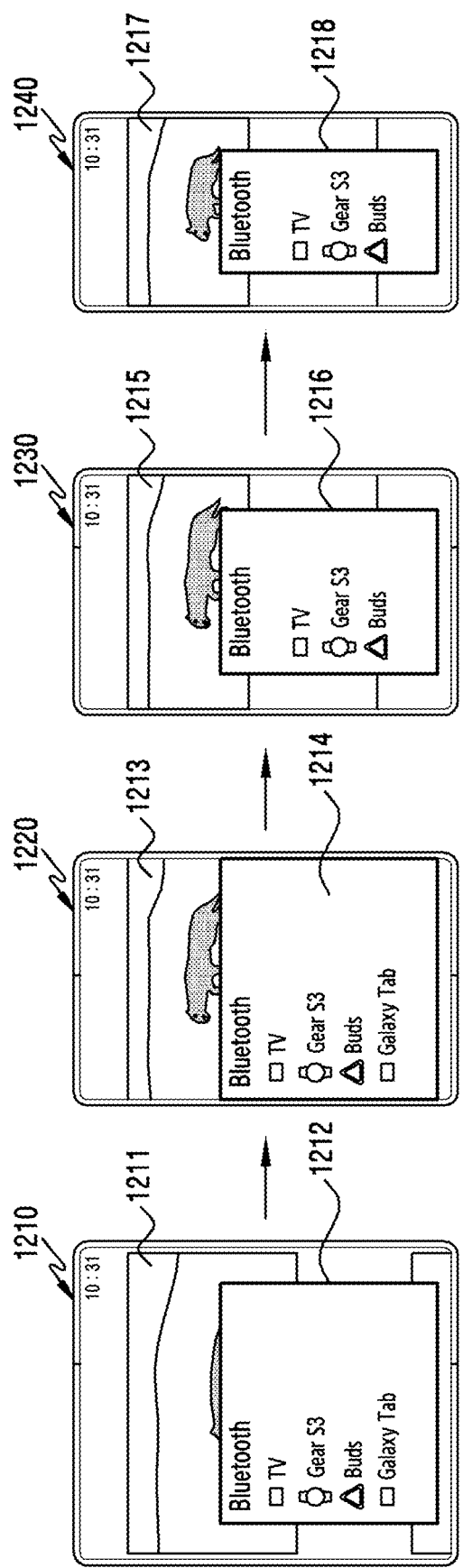
FIG. 11 illustrates a view of a resolution change of each content when an electronic device is contracted according to an embodiment.

FIG. 11 illustrates a view a change of a resolution of each content when an electronic device is contracted according to an embodiment.

Referring to FIG. 11, the processor 430 according to an embodiment may display at least one content including a first content 1211 and a second content 1212 in a first state 1210 (for example, a fully extended state). For example, the first content 1211 may be a content constituting some of background layers, and the second content 1212 may be a content that does not correspond to the background layers, like a dialog window, a list.

According to an embodiment, the processor 430 may display the first content 1213 the resolution of which is changed in a second state (for example, a partially contracted state). According to an embodiment, the processor 430 may change the resolution of the first content 1213 based on the second state 1220. According to an embodiment, the processor 430 may display the second content 1214 the resolution of which is not changed. According to an embodiment, the processor 430 may change a position or definition of the second content 1214 while the electronic device is changing from the first state 1210 to the second state 1220.

According to an embodiment, the processor 430 may display the first content 1215 the resolution of which is changed and the second content 1216 the resolution of which is changed in a third state 1230 (for example, a partially contracted state). According to an embodiment, the processor 430 may change the resolution of the first content 1215 based on the third state 1230. According to an embodiment, when it is determined that a length of the window displaying the second content in the contraction direction of the electronic device is equal to or longer than a length of the display in the same direction, the processor 430 may change the resolution of the second content from that time. According to an embodiment, the processor 430 may display the second content 1216 the resolution of which is changed according to the size of the contracted display region.

According to an embodiment, the processor 430 may display the first content 1217 the resolution of which is changed and the second content 1218 the resolution of which is changed in a fourth state 1240 (for example, a fully contracted state). According to an embodiment, when it is determined that the contraction of the electronic device is completed, the processor 430 may change the resolutions of the first content 1217 and the second content 1218, based on the fourth state 1240.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 340) including one or more instructions that are stored in a storage medium (e.g., internal memory 336 or external memory 338) that is readable by a machine (e.g., the electronic device 301). For example, a processor (e.g., the processor 320) of the machine (e.g., the electronic device 301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in other components. According to various embodiments, one or more of the above-described components or operations may be omitted, or one or more other components or operations may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

In the above-described specific embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

While specific embodiments have been described in the detailed descriptions of the disclosure, it will be understood by those skilled in the art that various changes in form and details may be made therein without departing from the spirit and scope of the disclosure as defined by the appended claims. Therefore, the scope of various embodiments of the disclosure is defined not by the described embodiments but by the appended claims or the equivalents to the claims.

As described above, an electronic device (for example, the electronic device 400 of FIG. 4) according to an embodiment may include: a first housing; a second housing which overlaps the first housing at least in part and is movable; a display having at least a first region exposed to an outside of the electronic device through a front surface of the electronic device, a second region extended from the first region of the display being drawn out from an inside of the first housing and being exposed to the outside of the electronic device along with the first region when the electronic device switches from a first state to a second state, the second region being drawn into the first housing when the electronic device switches from the second state to the first state; and at least one processor operatively connected with the display, and the at least one processor may control the display to display at least one content on the display, may determine a first content and a second content which is distinct from the first content, according to attribute information related to the at least one content, may identify that a region of the display is extended, in response to it being identified that the region of the display is extended, may change a resolution of the first content to correspond to a size of the extended region of the display while the display is being extended; and may change a resolution of the second content to correspond to the size of the extended region of the display after the extension of the display is completed.

According to an embodiment, when the electronic device is extended in a first direction, the at least one processor may determine, as the first content out of the at least one content, a content that is displayed on a window a length of which in the first direction is longer than or equal to a length of the display in the first direction that is exposed to the outside in the first state.

According to an embodiment, the at least one processor may determine the first content and the second content which is distinct from the first content, according to a designated priority of the at least one content.

According to an embodiment, the at least one processor may identify an extended state of the electronic device by using at least one sensor of a touch sensor, a ToF sensor, a proximity sensor, a hall sensor, an inertia sensor.

According to an embodiment, the electronic device may further include a memory, and the memory may store state information of the electronic device which is acquired by using the at least one sensor, as information including at least one of a static value and a dynamic state.

According to an embodiment, the static value may include size information of the region of the display that is exposed to the outside, or a distance between the second housing and the first housing.

According to an embodiment, the at least one processor may change screen brightness settings based on a size of the region of the display exposed to the outside.

According to an embodiment, the electronic device may be one of a slidable display electronic device and a rollable display electronic device.

As described above, an operating method of an electronic device (for example, the electronic device 400 of FIG. 4) may include: controlling a display to display at least one content on the display; determining a first content from among and a second content which is distinct from the first content, according to attribute information related to the at least one content; identifying that a region of the display is extended; in response to it being identified that the region of the display is extended, changing a resolution of the first content to correspond to a size of the extended region of the display while the display is being extended; and changing a resolution of the second content to correspond to the size of the extended region of the display after the extension of the display is completed.

According to an embodiment, the method may include, when the electronic device is extended in a first direction, determining, as the first content out of the at least one content, a content that is displayed on a window a length of which in the first direction is longer than or equal to a length of the display in the first direction that is exposed to the outside in the first state.

According to an embodiment, the method may include determining the first content and the second content which is distinct from the first content according to a designated priority of the at least one content.

According to an embodiment, the method may include identifying an extended state of the electronic device by using at least one sensor of a touch sensor, a ToF sensor, a proximity sensor, a hall sensor, an inertia sensor.

According to an embodiment, the method may include storing, in a memory, state information of the electronic device which is acquired by using the at least one sensor, as information including at least one of a static value and a dynamic state.

According to an embodiment, the static value may include size information of the region of the display that is exposed to the outside, or a distance between a second housing and a first housing.

According to an embodiment, the method may include changing screen brightness settings based on a size of the region of the display exposed to the outside.

According to an embodiment, the electronic device may be one of a slidable display electronic device and a rollable display electronic device.

As described above, an electronic device (for example, the electronic device 400 of FIG. 4) according to an embodiment may include: a first housing; a second housing which overlaps the first housing at least in part and is movable; a display having at least a first region exposed to an outside of the electronic device through a front surface of the electronic device, a second region extended from the first region of the display being drawn out from an inside of the first housing and being exposed to the outside of the electronic device along with the first region when the electronic device switches from a first state to a second state, the second region being drawn into the first housing when the electronic device switches from the second state to the first state; and at least one processor operatively connected with the display, and the at least one processor may control the display to display at least one content on the display, may determine a first content and a second content which is distinct from the first content, according to attribute information related to the at least one content; identify that a region of the display is contracted, in response to it being identified that the region of the display is contracted, may change a resolution of the first content to correspond to a size of the contracted region of the display while the display is being contracted; and may change a resolution of the second content to correspond to the size of the contracted region of the display from a time when a length in a contraction direction of the display exposed to the outside is shorter than a length in the contraction direction of a window in which the second content is displayed.

According to an embodiment, when the electronic device is contracted in a first direction, the at least one processor may determine, as the first content out of the at least one content, a content that is displayed on a window a length of which in the first direction is longer than or equal to a length of the display in the first direction that is exposed to the outside in the second state.

According to an embodiment, the at least one processor may determine the first content and the second content which is distinct from the first content, according to a designated priority of the at least one content.

According to an embodiment, the at least one processor may identify a contracted state of the electronic device by using at least one sensor of a touch sensor, a ToF sensor, a proximity sensor, a hall sensor, an inertia sensor.

According to an embodiment, the electronic device may be one of a slidable display electronic device and a rollable display electronic device.

According to various embodiments of the disclosure, when a display region of a display is changed in an electronic device including a flexible display, a natural and fast screen change can be provided to a user.

According to various embodiments, when a display region of a display is changed in an electronic device including a flexible display, a window the resolution of which is changed is restricted, so that efficiency of the electronic device related to a battery, heat emission, and user experience can be enhanced.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a first housing;
a second housing that overlaps the first housing at least in part and is movable;
a display including:
at least a first region exposed to an outside of the electronic device through a front surface of the electronic device; and
a second region extending from the first region of the display and configured to be drawn out from an inside of the first housing exposed to the outside of the electronic device along with the first region when the electronic device switches from a first state to a second state, wherein the second region is drawn into the first housing when the electronic device switches from the second state to the first state; and
at least one processor operatively connected with the display, wherein the at least one processor is configured to:
control the display to display a plurality of contents on the display;
determine a first content from among the plurality of contents, and a second content that is distinct from the first content, according to attribute information of each of the plurality of contents;
identify that a region of the display is extended while the plurality of contents are displayed on the display;
in response to identifying that the region of the display is starting to extend, change a resolution of the first content, among the plurality of displayed contents, to correspond to a size of the extended region of the display while the display is being extended; and
in response to identifying that an extension of the display is completed, change a resolution of the second content, among the plurality of displayed contents, to correspond to the size of the extended region of the display after the extension of the display is completed.

2. The electronic device of claim 1, wherein, when the electronic device is extended in a first direction, the at least one processor is configured to determine, as the first content from among the plurality of contents, a content that is displayed on a window, and
wherein a length of the window in the first direction is longer than or equal to a length of the display in the first direction that is exposed to the outside of the electronic device in the first state.

3. The electronic device of claim 1, wherein the at least one processor is further configured to determine the first content and the second content, and
wherein the second content is distinct from the first content, according to designated priorities of the plurality of contents.

4. The electronic device of claim 1, wherein the at least one processor is further configured to identify an extended state of the electronic device by using at least one sensor of a touch sensor, a time of flight (ToF) sensor, a proximity sensor, a hall sensor, or an inertia sensor.

5. The electronic device of claim 4, further comprising a memory,
wherein the memory is configured to store state information of the electronic device that is acquired by using the at least one sensor, as information comprising at least one of a static value and a dynamic state.

6. The electronic device of claim 5, wherein the static value comprises size information of the extended region of the display that is exposed to the outside of the electronic device, or a distance between the second housing and the first housing.

7. The electronic device of claim 1, wherein the at least one processor is further configured to change screen brightness settings based on a size of the extended region of the display exposed to the outside of the electronic device.

8. The electronic device of claim 1, wherein the electronic device is a slidable display electronic device or a rollable display electronic device.

9. An operating method of an electronic device, the method comprising:
controlling a display to display a plurality of contents on the display;
determining a first content from among the plurality of contents, and a second content that is distinct from the first content, according to attribute information of each of the plurality of contents;
identifying that a region of the display is extended while the plurality of contents are displayed on the display;
in response to identifying that the region of the display is starting to extend, changing a resolution of the first content, among the plurality of displayed contents, to correspond to a size of the extended region of the display while the display is being extended; and
in response to identifying that an extension of the display is completed, changing a resolution of the second content, among the plurality of displayed contents, to correspond to the size of the extended region of the display after the extension of the display is completed.

10. The method of claim 9, comprising, when the electronic device is extended in a first direction, determining, as the first content from among the plurality of contents, a content that is displayed on a window,
wherein a length of the window in the first direction is longer than or equal to a length of the display in the first direction that is exposed to an outside of the electronic device in a first state.

11. The method of claim 9, comprising identifying an extended state of the electronic device by using at least one sensor of a touch sensor, a time of flight (ToF) sensor, a proximity sensor, a hall sensor, or an inertia sensor.

12. The method of claim 11, comprising storing, in a memory, state information of the electronic device that is acquired by using the at least one sensor, as information comprising at least one of a static value and a dynamic state.

13. The method of claim 12, wherein the static value comprises size information of the extended region of the display that is exposed to an outside of the electronic device, or a distance between a second housing and a first housing.

14. The method of claim 9, comprising changing screen brightness settings based on a size of the extended region of the display exposed to an outside of the electronic device.

15. The method of claim 9, wherein the electronic device is a slidable display electronic device or a rollable display electronic device.

16. An electronic device comprising:
a first housing;
a second housing that overlaps the first housing at least in part and is movable;
a display including:
  at least a first region exposed to an outside of the electronic device through a front surface of the electronic device; and
  a second region extending from the first region of the display and configured to be drawn out from an inside of the first housing and exposed to the outside of the electronic device along with the first region when the electronic device switches from a first state to a second state, wherein the second region being is into the first housing when the electronic device switches from the second state to the first state; and
at least one processor operatively connected with the display, wherein the at least one processor is configured to:
control the display to display a plurality of contents on the display;
determine a first content from among the plurality of contents, and a second content that is distinct from the first content, according to attribute information of each of the plurality of contents;
identify that a region of the display is contracted while the plurality of contents are displayed on the display;
in response to identifying that the region of the display is starting to contract, change a resolution of the first content, among the plurality of displayed contents, to correspond to a size of the contracted region of the display while the display is being contracted; and
in response to identifying that a contraction of the display is completed, change a resolution of the second content, among the plurality of displayed contents, to correspond to the size of the contracted region of the display from a time when a length in a contraction direction of the display exposed to the outside of the electronic device is shorter than a length in the contraction direction of a window in which the second content is displayed.

17. The electronic device of claim 16, wherein, when the electronic device is contracted in a first direction, the at least one processor is configured to determine, as the first content from among the plurality of contents, a content that is displayed on a window, and
wherein a length of the window in the first direction is longer than or equal to a length of the display in the first direction that is exposed to the outside of the electronic device in the second state.

18. The electronic device of claim 16, wherein the at least one processor is configured to determine the first content and the second content, and
wherein the second content is distinct from the first content, according to designated priorities of the plurality of contents.

19. The electronic device of claim 16, wherein the at least one processor is configured to identify a contracted state of the electronic device by using at least one sensor of a touch sensor, a time of flight (ToF) sensor, a proximity sensor, a hall sensor, or an inertia sensor.

20. The electronic device of claim 16, wherein the electronic device is a slidable display electronic device or a rollable display electronic device.

* * * * *